(12) United States Patent     (10) Patent No.:   US 12,600,400 B2

Lee     (45) Date of Patent:   Apr. 14, 2026

(54) STEERING WHEEL GRIP ASSEMBLY FOR AUTOMOBILES

(71) Applicant: Samilbnc Co., Ltd., Seoul (KR)

(72) Inventor: Hyun Ju Lee, Seoul (KR)

(73) Assignee: Samilbnc Co., Ltd., Seoul (KR)

( * ) Notice: Subject to any disclaimer, the term of this patent is extended or adjusted under 35 U.S.C. 154(b) by 0 days.

(21) Appl. No.: 18/777,527

(22) Filed: Jul. 18, 2024

(65)       Prior Publication Data

US 2025/0128753 A1    Apr. 24, 2025

(30)       Foreign Application Priority Data

Oct. 23, 2023    (KR) ........................ 10-2023-0142335

(51) Int. Cl.
    *B62D 1/04*        (2006.01)
    *B62D 1/06*        (2006.01)

(52) U.S. Cl.
    CPC ..................................... *B62D 1/06* (2013.01)

(58) Field of Classification Search
    CPC .................................. B62D 1/043; B62D 1/06
    See application file for complete search history.

(56)       References Cited

U.S. PATENT DOCUMENTS

| | | | | | |
|---|---|---|---|---|---|
| 3,416,989 | A | * | 12/1968 | Lawler | A44C 23/00 |
| | | | | | 428/3 |
| 5,139,014 | A | * | 8/1992 | Chang | B62D 1/06 |
| | | | | | 601/19 |
| 5,213,007 | A | * | 5/1993 | Yoo | B62D 1/06 |
| | | | | | 74/552 |
| 5,224,397 | A | * | 7/1993 | Yoo | B62D 1/06 |
| | | | | | 74/552 |
| 5,393,298 | A | * | 2/1995 | Chang | B60R 11/00 |
| | | | | | 601/134 |
| D931,169 | S | * | 9/2021 | Lee | D12/177 |
| D1,061,364 | S | * | 2/2025 | Lee | D12/177 |
| 2024/0286058 | A1 | * | 8/2024 | Krieg | A63H 33/3033 |

FOREIGN PATENT DOCUMENTS

| | | | | |
|---|---|---|---|---|
| CN | 104973116 | B | * | 8/2017 |
| CN | 109017965 | A | * | 12/2018 |
| KR | 200441064 | Y1 | * | 7/2008 |
| KR | 20090009122 | U | * | 9/2009 |
| KR | 200486026 | Y1 | * | 3/2018 |
| KR | 20190098019 | A | | 8/2019 |

OTHER PUBLICATIONS

Machine translation of CN 109017965 A obtained on Mar. 31, 2025.*

Machine translation of KR 200486026 Y1 obtained on Mar. 31, 2025.*

* cited by examiner

*Primary Examiner* — Adam D Rogers

(74) *Attorney, Agent, or Firm* — NKL Law; Jae Youn Kim

(57)       ABSTRACT

Provided is a steering wheel grip assembly for automobiles, and more in detail, the steering wheel grip assembly which can achieve acupressure effect while being attached to a part of the car steering wheel, and the grip assembly can achieve, while driving or parking, prevention of drowsiness, recovery from fatigue, improvement of concentration, and relief from stress.

10 Claims, 11 Drawing Sheets

233

234

231

300

331
332
334
330
333
340
320
310

STEERING WHEEL GRIP ASSEMBLY FOR AUTOMOBILES

CROSS-REFERENCE TO RELATED PATENT APPLICATION

This application claims the benefit of Korean Patent Application No. 10-2023-142335 filed on Oct. 23, 2023, in the Korean Intellectual Property Office, the disclosure of which is incorporated herein with its entirety by reference.

BACKGROUND OF THE INVENTION

The present invention relates to a steering wheel grip assembly for automobiles, and more in detail, the steering wheel grip assembly which can achieve acupressure effect while being attached to a part of the car steering wheel, and the grip assembly can achieve, while driving or parking, prevention of drowsiness, recovery from fatigue, improvement of concentration, and relief from stress.

Generally, when driving a vehicle for a long time, a driver may become bored and feel fatigued, and thus, the possibility of an accident increases.

Most of drivers feel the fatigue phenomenon while driving for long periods of time, but, there is no other special solution other than stopping driving and taking a break, and therefore, the drivers respond by taking actions, such as, driving with the car windows open or increasing the audio volume.

However, the above-mentioned method of fighting off fatigue or drowsiness while the driver is restrained to the driver's seat, and it can be only a short-term ambient ventilation, and therefore, it was not possible to effectively fight off fatigue or drowsy driving effects.

(Patent 001) Published Patent 10-2019-0098019

SUMMARY OF THE INVENTION

The present invention is to solve the above-mentioned problems and the purpose of this present invention is to provide the steering wheel grip assembly for automobiles which can achieve acupressure effect while being attached to a part of the car steering wheel, and the grip assembly can achieve, while driving or parking, by operating an operator, prevention of drowsiness, recovery from fatigue, improvement of concentration, and relief from stress.

A steering wheel grip assembly for automobiles according to this present application includes a grip body attached to a portion of a car steering wheel configured for covering partially an outer circumference of the portion, and having a plurality of body protrusions disposed on a portion of an outer side surface of the grip body and an opening disposed at an end of the grip body and partially surrounding the outer circumference; and a fidget mounted on the grip body, wherein the fidget includes: a housing comprising an exterior of the fidget and mounted on the grip body, and an operator mounted on the housing, and the operator can be operated by a user with fingers when the user grips the grip body.

According to one embodiment, the grip body has a predetermined width and a predetermined area, along a longitudinal direction and a circumferential direction, and includes a grip on which the plurality of body protrusions is formed, and a mounting groove in which the fidget is mounted, and the mounting groove is disposed symmetrically at a front and a rear of the grip body, and each mounting groove is disposed at an end of a longitudinal direction of the grip body, and therefore, and a thumb and an index can be positioned on the fidget mounted on the mounting groove if a user grips the grip with a palm of the user.

According to one embodiment, the grip body has a predetermined width and a predetermined area along a longitudinal direction and a circumferential direction and includes a grip on which the plurality of body protrusions is formed, and a mounting groove in which the fidget is mounted, and the mounting groove is disposed in a rear direction of the grip body and positioned at one side in the longitudinal direction of the fidget, and when the user grips the grip with the palm, the index finger of the user can be positioned on the fidget mounted on the mounting groove.

According to one embodiment, the fidget includes a lower housing having a mounting groove, an upper housing covering the lower housing and including an exposure hole disposed on the mounting groove, and an operation gear disposed in the mounting groove and exposed to an outside thorough the exposure hole.

According to one embodiment, the operation gear having a gear body including a cog, and a gear shaft part including a polygonal shaft having at least one edge. The mounting groove includes a gear groove on which the gear body is disposed, and a shaft groove disposed at both sides of the gear groove and the gear shaft part is positioned on the shaft groove.

According to one embodiment, the fidget includes a lower housing having a mounting groove, an upper housing covering the lower housing and including an exposure hole which is disposed on the mounting groove, a pressing button disposed on the lower housing, wherein at least of a portion of the pressing button is exposed to an outside through the exposure hole, and a leaf spring disposed in the mounting groove and below the pressing button.

According to one embodiment, the pressing button includes a base board having an area, a button protrusion having a predetermined height and a pillar-shape and disposed at an upper surface of the base board, and a lower protrusion disposed at a lower surface of the base board and below the pressing button. The lower protrusion is in contact with the leaf spring when an external force is not applied, the lower protrusion descends and reverses the leaf spring when the pressing button is pressed by the external force and the lower protrusion is pressed, and the leaf spring is restored when the external force is removed.

According to one embodiment, the fidget includes a fidget housing having a mounting groove and a shaft hole extending in a direction intersecting the mounting groove, a panel steel plate disposed on a lower surface of the mounting groove, a seesaw button disposed in the mounting groove and on the panel steel plate, and a magnet disposed on a lower part of the seesaw button, wherein the seesaw button is configured for seesaw movement around a seesaw shaft penetrating the shaft hole, wherein the magnet is disposed symmetrically at both ends of the lower part of the seesaw button with the seesaw shaft as the center, and wherein the magnet is disposed at both ends of the panel steel plate in a longitudinal direction.

According to one embodiment, the fidget housing further includes a side wall comprising an outer peripheral portion of the fidget housing and surrounding the mounting groove, an open slot disposed at the side wall, and a fixing pin disposed in the mounting groove and spaced apart from the lower surface of the mounting groove, wherein the fixing pin is open in a direction toward the open slot, wherein the panel steel plate is inserted into the mounting groove through the open slot, and wherein the panel steel plate is fixed by being coupled between the fixing pin and the lower surface of the mounting groove.

According to one embodiment, the fidget includes a lower housing having a mounting groove, an upper housing covering the lower housing and including an exposure hole disposed on the mounting groove, a ball button disposed on the lower housing, wherein at least a portion of the ball button is exposed to an outside through the exposure hole, and a leaf spring disposed in the mounting groove and below the pressing button.

According to one embodiment, the ball button is a sphere-shaped button having a predetermined diameter. And the ball button reverses the leaf spring when an external force is applied and the ball button is pressed, and the external force is removed, the leaf spring is restored.

The steering wheel grip assembly may further include a cover configured for covering a portion of the car steering wheel which is not covered by the steering wheel grip assembly. In other words, if a car steering wheel is divided by two portions-a first portion and a second portion, and the grip body is configured to cover the first portion, the cover is configured to cover the second portion of the car steering wheel.

According to embodiments of this present invention, the user can grip the grip body and operate the operator with fingers while the steering wheel grip assembly for automobiles is attached to a part of the steering wheel grip assembly. The user grips the grip body with a palm to get an acupuncture effect by the body protrusion, and at the same time, while driving and parking, drowsy driving can be prevented, improvement of concentration, and relief of stress can be achieved by operating the operator.

DETAILED DESCRIPTION

Hereinafter, referring to the attached drawings, one or more embodiments according to the present invention are described.

Figure 1:
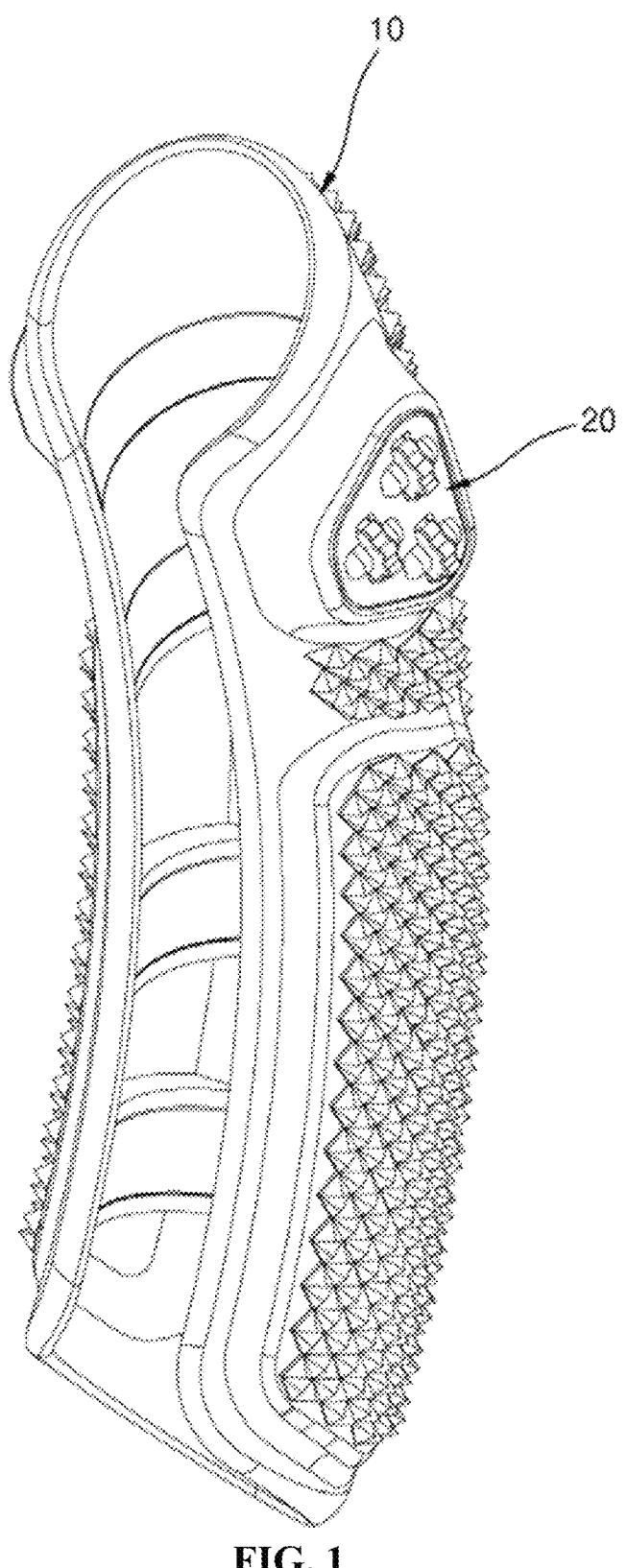
FIG. 1 illustrates an appearance of a steering wheel grip assembly for automobiles according to an embodiment of this present invention.
Figure 2:
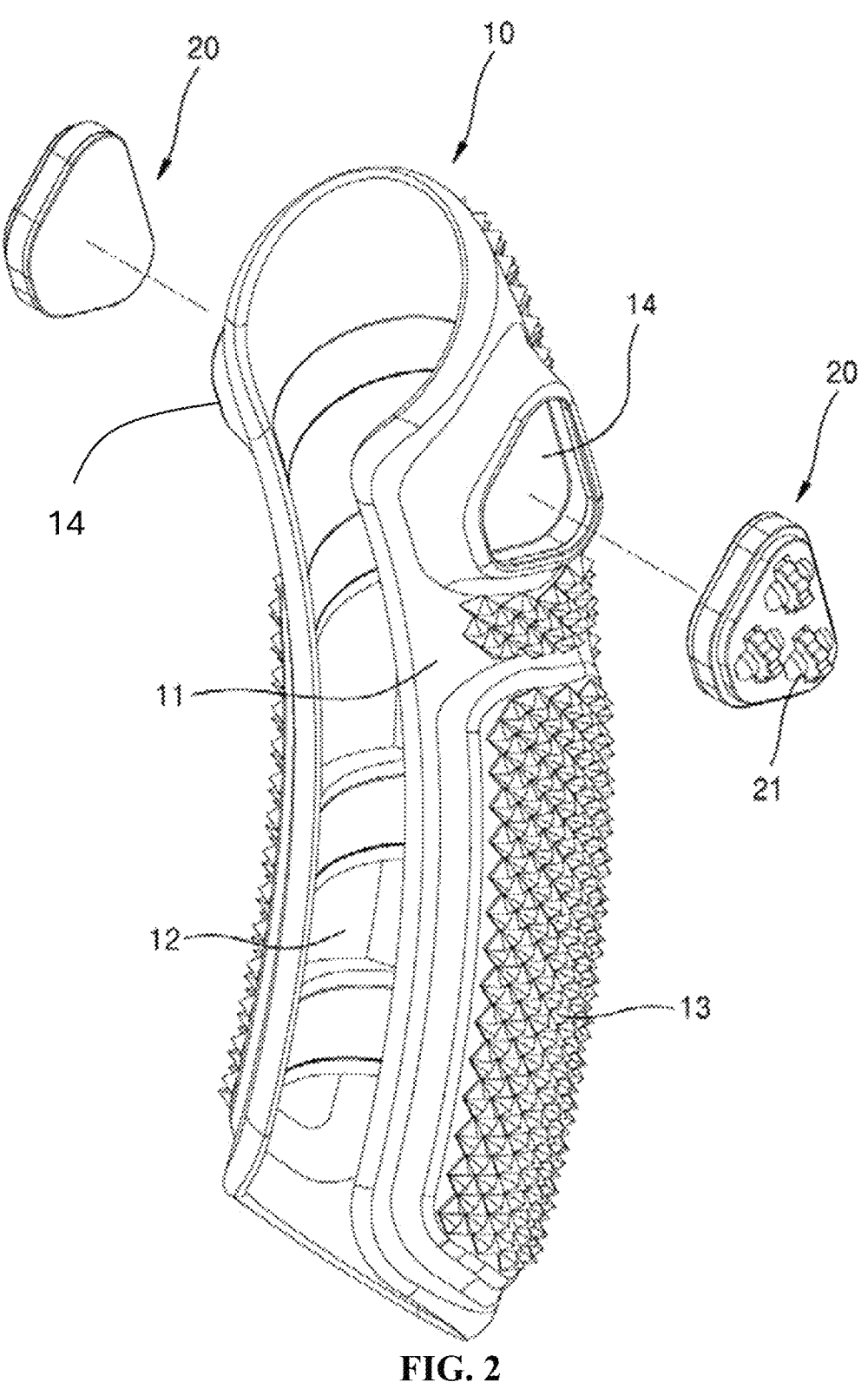
FIG. 2 is an exploded view of the steering wheel grip assembly for automobiles according to this present invention.

FIG. 1 illustrates appearance of a steering wheel grip assembly for automobiles as an embodiment of this present invention, FIG. 2 is an exploded view showing a steering wheel grip assembly for automobiles according to an embodiment of this present invention.

The steering wheel grip assembly for automobiles according to an embodiment of this present invention may be attached to a part of the steering wheel of automobiles and surround a circumference of the attached part, and may include a grip body (10) having a plurality of body protrusion on a portion of an outer circumference thereof, and an opening disposed at an end of the grip body and partially surrounding the outer circumference; and a fidget (20) mounted on the grip body (10).

The grip body (10) is extended with a curvature and has a body part (11) in which a wheel mounting space (12) is formed inside, a grip part (13) formed in the body part (11), and a mounting groove (14).

The grip part (13) has a predetermined width and a predetermined area along a longitudinal and circumferential direction of the grip body (10), and it is a realm where the body protrusion is formed.

The mounting groove (14) may comprise a groove on which the fidget (20) can be mounted.

According to one embodiment of this present invention, the mounting groove (14) may be positioned symmetrically at a front and a rear of the body part (11), and each of the mounting groove (14) may be disposed at one side of the body part (11) in the longitudinal direction. Therefore, when the user grips the grip part (13) with the palm, the user's thumb and index finger may be positioned on the fidget (20) mounted on the mounting groove (14). In this way, when the fidget (20) is located on the user's thumb and index finger, the user may operate the fidget (20) with the thumb and the index finger. In such a case, the user can have various feelings of operation.

Meanwhile, according to one embodiment of this present invention, the mounting groove (14) may be disposed at a rear of the body part (11). The mounting groove (14) may be disposed at one side of the body part (11) in the longitudinal direction. Therefore, when the user grips the grip part (13) with the palm, the user's index finger may be positioned on the fidget (20) mounted on the mounting groove (14). In this way, when the fidget (20) is located on the user's index finger, the user may operate the fidget with the index finger. In such a case, the user operates the fidget (20) with the index finger, and thus, concentration on driving may not be disturbed.

Figure 11:
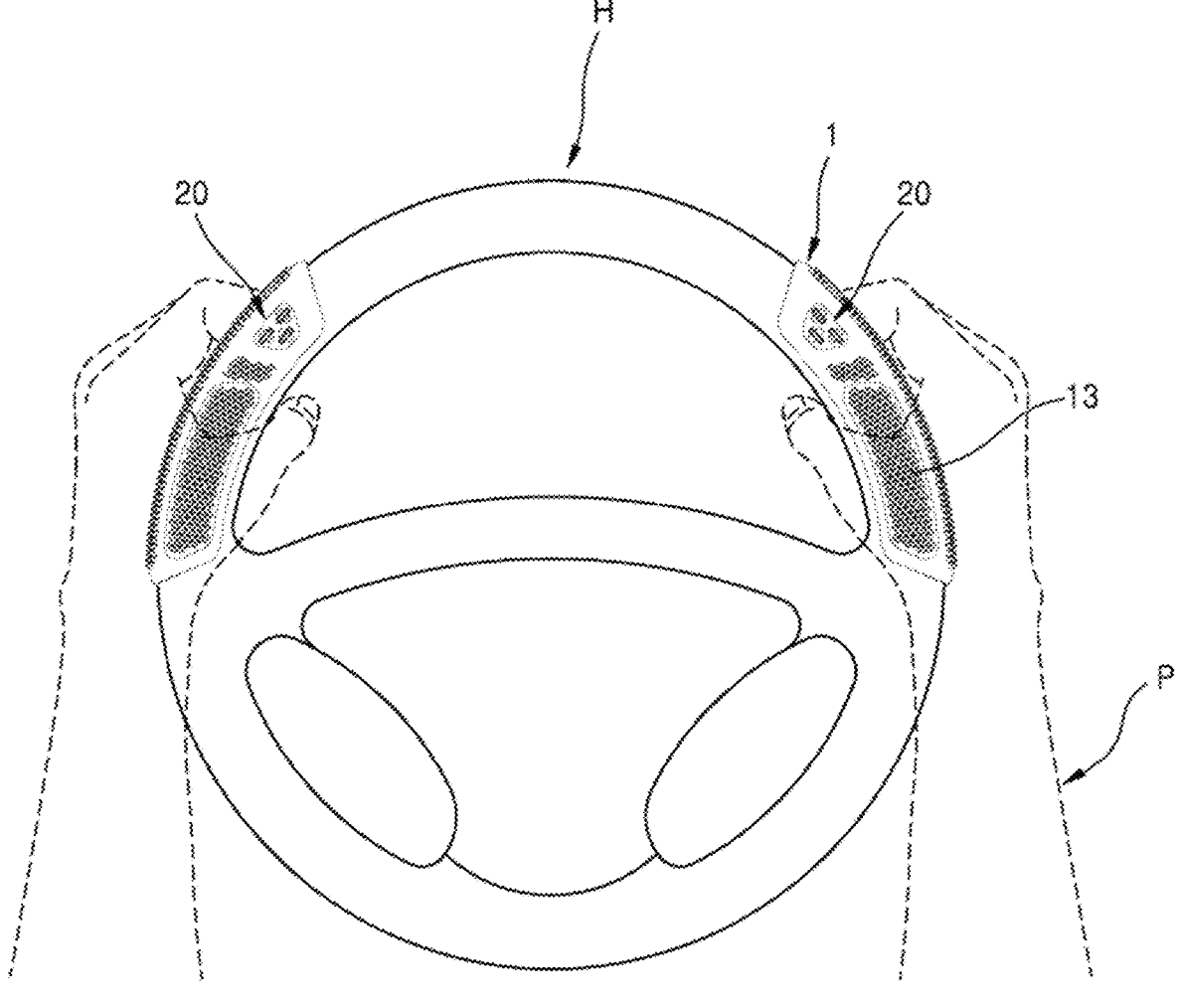
FIG. 11 shows the steering wheel grip assembly for automobiles according to this present invention in which the grip assembly is mounted on the steering wheel and used.

Here, the front and the rear are explained in referring to FIGS. 2 and 11. In other words, according to the embodiment of this present invention, when the steering wheel grip assembly (1) for automobiles is attached to the steering wheel (H), a direction in which the driver is located (the rear direction of the automobile) is the front direction, and a direction in which the bonnet is located (the front direction of the automobile) is the rear direction. In other words, the shape, structure, and the like of the grip body (10) and fidget (20) may be explained in reference to the diagrams in the drawings, and the embodiments include the descriptions in the drawings.

Meanwhile, according to one embodiment of this present invention, the fidget (20) may have a structure in which it can be selectively attached to or detached from the mounting groove (14). Accordingly, the mounting groove (14) may include coupling means and the like and its detailed structure is not limited hereby. Therefore, the fidget (20) to be mentioned later may be selectively coupled to the mounting groove (14), and thus, the user may choose a sense of operation.

The fidget (20) may include a housing comprising an exterior of the fidget (20), and may include a housing attached to the grip body (10), and an operator (21) mounted on the housing.

The operator (21) may be operated by fingers in a state in which the user grips the grip body (10).

In a state where the steering wheel grip assembly for automobiles is attached to a part of the steering wheel according to one embodiment of this present invention, the user may grip the grip body (10) and operate an operator (21) with fingers. By gripping the grip body (10) with a palm, the user can obtain acupuncture effect with the body protrusions of the grip body (10), and at the same time, while driving or parking, prevention of drowsiness, improvement of concentration, recovery from fatigue, and relief of stress can be achieved by operating an operator (21).

Hereinafter, a detailed structure of a fidget (100) will be described for each specific embodiment.

Figure 3:
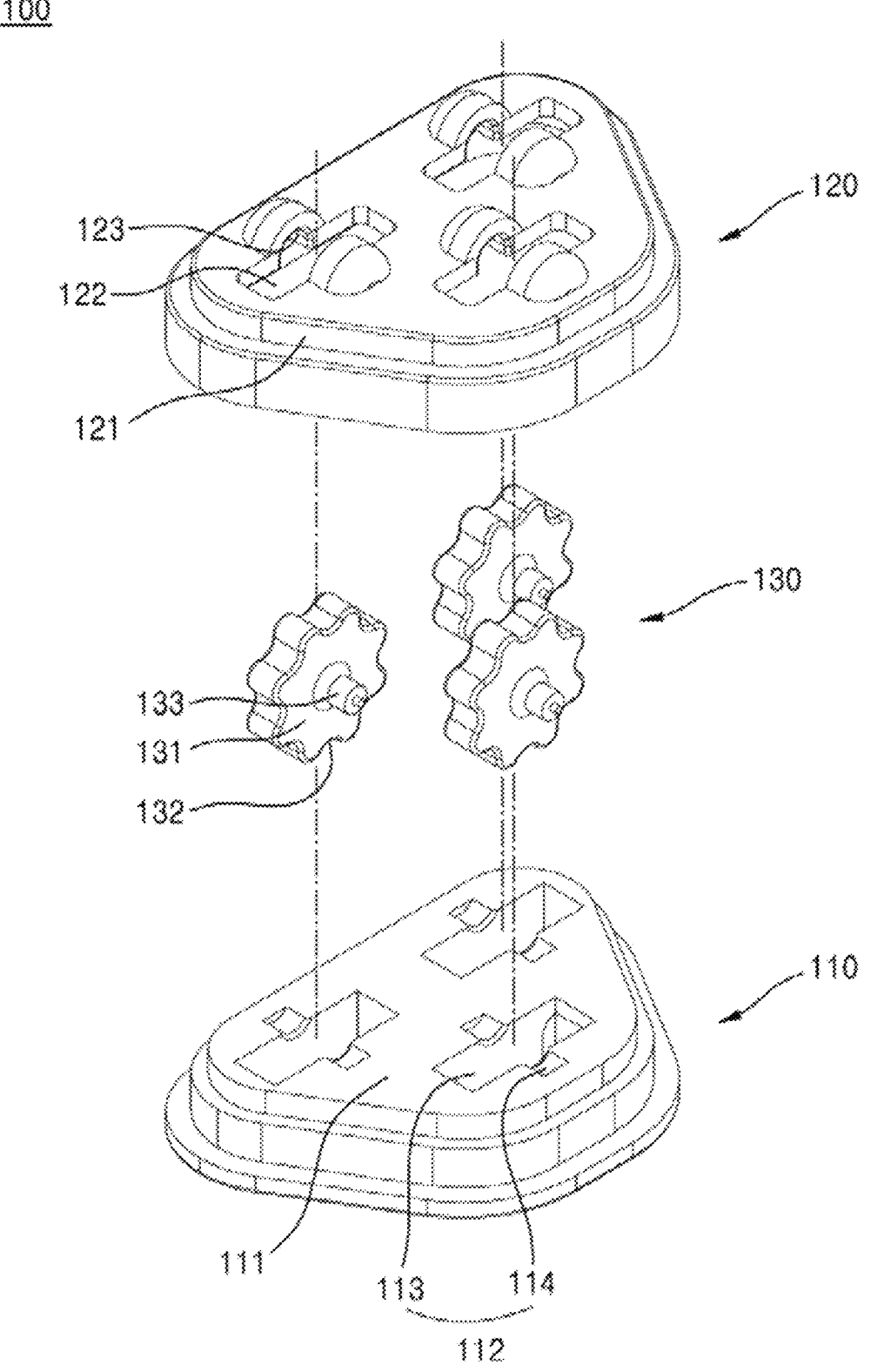
FIG. 3 is an exploded view of a fidget of the steering wheel grip assembly for automobiles according to the embodiment of this present invention.
Figure 4:
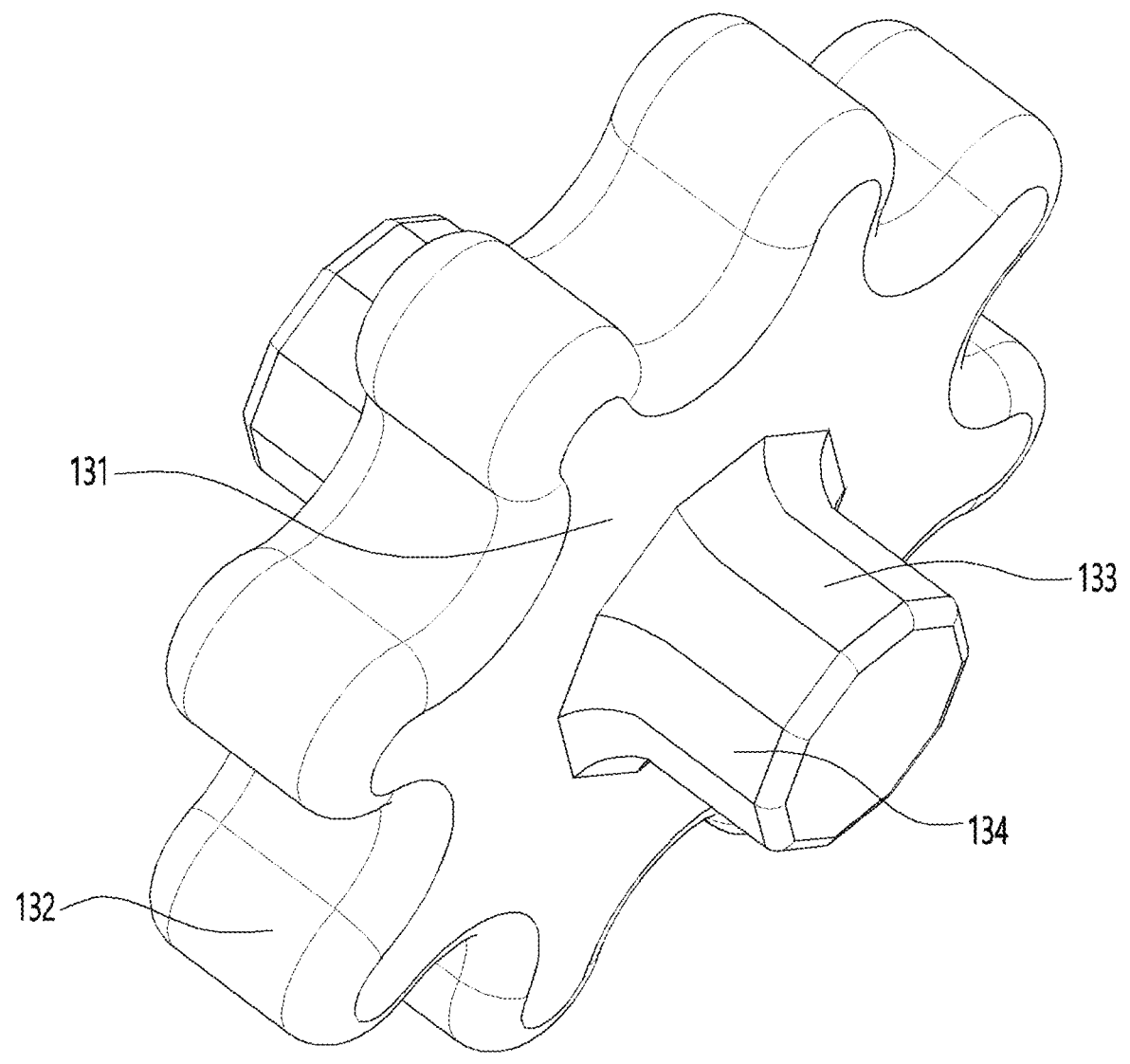
FIG. 4 is an enlarged view showing the operation gear in FIG. 3.

FIG. 3 is a diagram showing an exploded view of a fidget (100) of a steering wheel grip assembly for automobiles according to an embodiment of this present invention, and FIG. 4 shows an enlarged view showing the operation gear (130) in FIG. 3.

According to one embodiment of this present invention, the fidget (100) may include a lower housing (110) on which a mounting groove (112) is disposed, an upper housing (120) covering the lower housing (110) and having an exposure hole (122) which is disposed on the mounting groove (112), and an operation gear (130) disposed in the mounting groove (112) and exposed to an outside through the exposure hole (122).

The lower housing (110) comprises a lower portion of the housing. The lower housing (110) has a lower housing body (111) and a mounting groove (112) disposed on an upper surface of the lower housing body (111). The mounting groove (112) may include a gear groove (113) and a shaft groove (114).

The upper housing (120) has an upper housing body (121) and an exposure hole (122) penetrating the upper housing body (121). At a periphery of the exposure hole (122), an upper shaft groove (123) may be disposed.

The operation gear (130) may include a gear body (131) having a cog (132), and a gear shaft part (133) forming a shaft of the gear body (131).

The gear body (131) includes the cog (132), and the cog (132) having a recess and a protrusion, repetitively, surrounds a periphery of the gear body (131).

The gear shaft part (133) forms or serves as a rotation shaft of the gear body (131). The gear shaft part (133) may comprise a polygonal shaft having edges (134).

When the gear body (13) is mounted on the mounting groove (112), the gear body (131) is positioned in the gear groove (113), and the gear shaft part (133) may be positioned in the shaft groove (114). As described above, while the operation gear (130) is positioned in the mounting groove (112) of the lower housing (110), the upper housing (120) may be coupled to the lower housing (110). When the upper housing (120) and the lower housing (110) are coupled, the gear body (131) may be exposed outside through the exposure hole (122). Additionally, the gear shaft part (133) may be positioned in the shaft groove (114) and the upper shaft groove (123).

The user may operate an operation gear (130) with fingers. More specifically, the operation gear may be operated by turning the cog (132) of the gear body (131) exposed outside through the exposure hole (122) with a finger. At this time, according to the embodiment of this present application, the gear shaft part (133) forming a rotation shaft of the operation gear (130) may be a polygonal shaft on which edges (134) are formed. Accordingly, the user may feel a sense of operation during the course of rotating the operation gear (130). Having such a sense of operation, the user may prevent drowsy driving, improve concentration, recover from fatigue, and relieve stress. Moreover, the user's hearing may be stimulated by the sound generated during the course of the operation.

Figure 5:
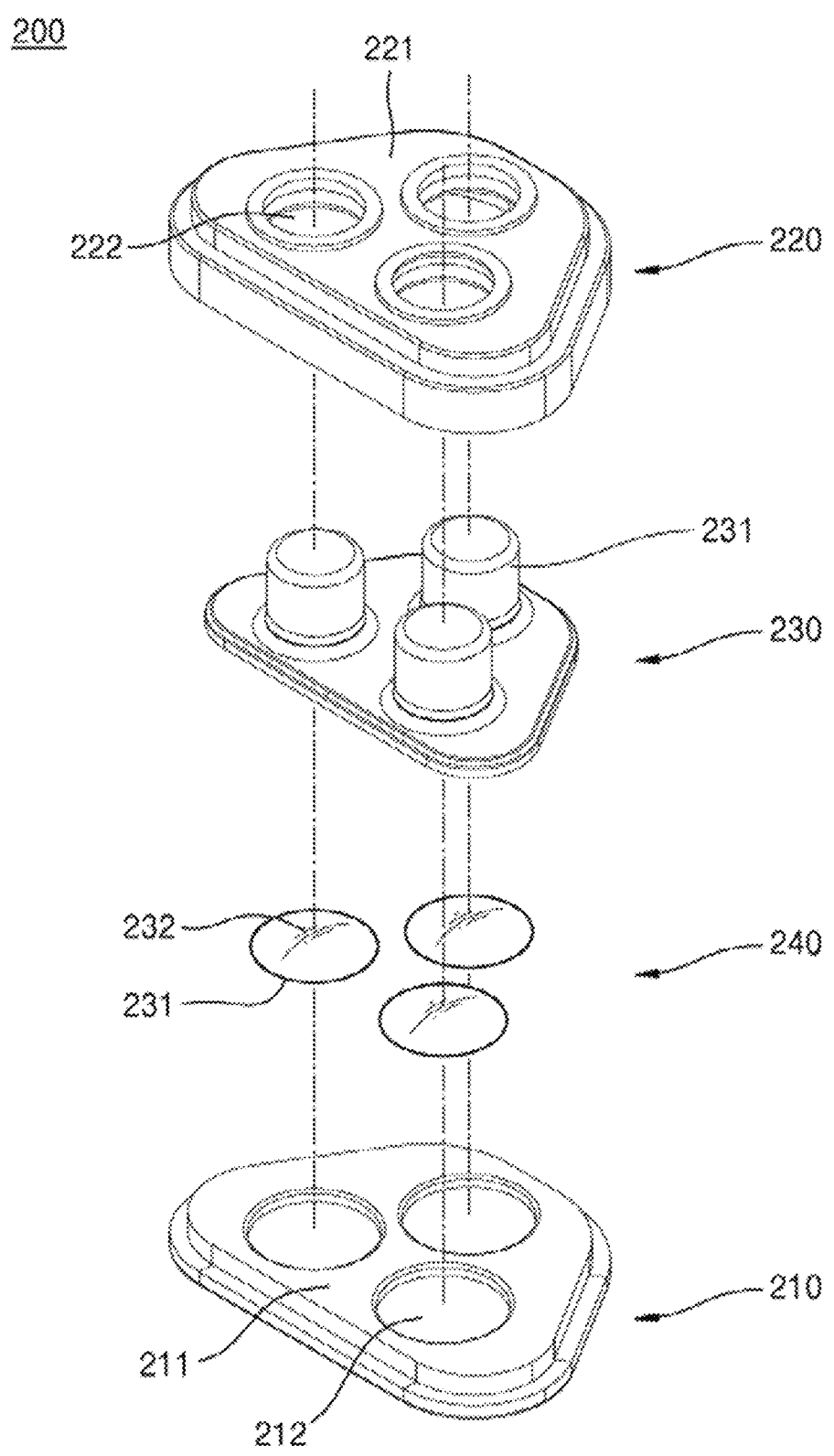
FIG. 5 is an exploded view describing a fidget of the steering wheel grip assembly for automobiles according to another embodiment of this present invention.
Figure 6:
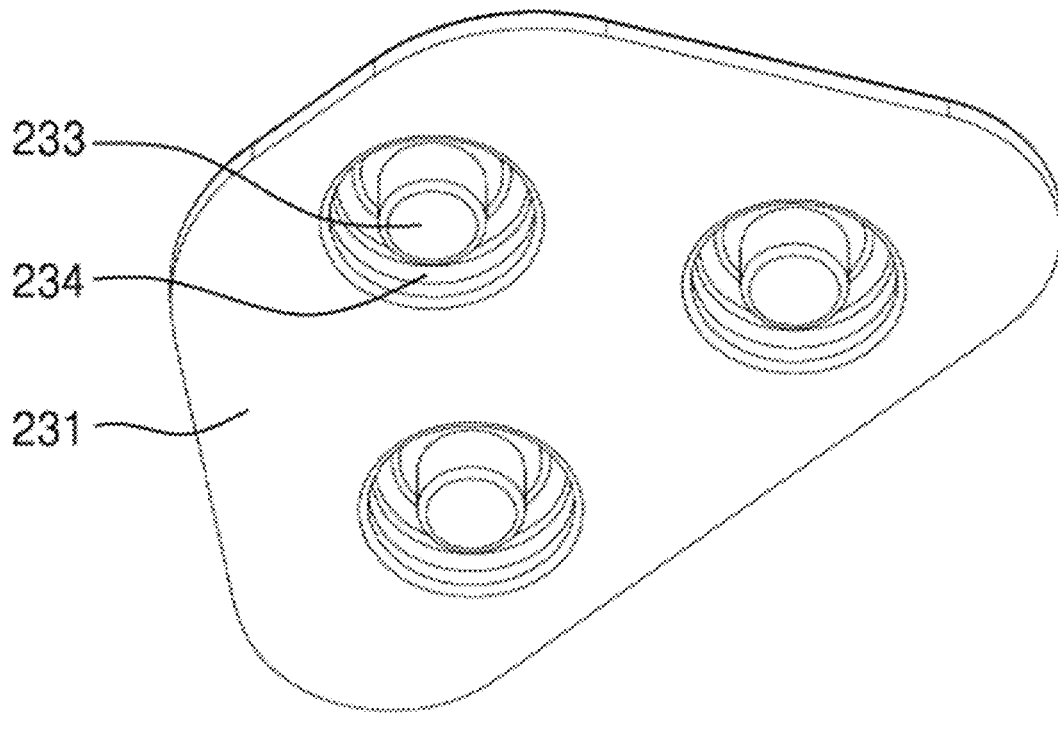
FIG. 6 is an enlarged view showing the lower portion of the pressing button in FIG. 5.

FIG. 5 is an exploded view showing a fidget (200) of a steer wheel grip for automobiles according to an embodiment of this present invention, and FIG. 6 is an enlarged view showing the lower portion of the pressing button (230) in FIG. 5.

According to one embodiment of the present application, the fidget (200) may include a lower housing (210) in which a mounting groove (212) is disposed, an upper housing (220) that covers the lower housing (210) and has an exposure hole (222) disposed on the mounting groove (212), a pressing button (230) disposed on the lower housing (210), wherein at least a portion of the pressing button is exposed outside through the exposure hole (222), and a leaf spring (240) disposed in the mounting groove (212) and below the pressing button (230).

The lower housing (210) forms a lower part of a housing. The lower housing (210) includes a lower housing body (211), a mounting groove (212) disposed at an upper surface of the lower housing body (211). The number of the mounting groove (212) may be plural.

The upper housing (220) may include an upper housing body (221) and an exposure hole penetrating the upper housing body (221). The number of the exposure hole (222) may be plural.

The pressing button (230) includes a base board (231) having a predetermined area, a button protrusion (232) disposed on an upper surface of the base board (231) and having a predetermined height with a pillar shape, and a lower protrusion disposed on a lower surface of the base board (231) and below the button protrusion (232).

The base board (231) may have a predetermined area. The base board (231) may be positioned between the upper housing (220) and the lower housing (210).

The button protrusion (232) may be disposed on the base board (231) and may have a pillar shape. The number of button protrusion (232) may be plural.

A lower protrusion (234) may be disposed on a lower portion of the base board (231) and may be a protrusion protruding in a downward direction. Specifically, a lower groove (233) may be formed at the lower surface of the base board (231), and the lower protrusion (234) may be included in the lower groove (233). The number of the lower protrusion (234) may be plural.

The numbers of the button protrusion (232) and the lower protrusion (234) are the same, and they may be positioned side by side above and below each other. That is, the lower protrusion (234) may be disposed below the button protrusion (232).

The leaf spring (240) may be a shield-type spring. The leaf spring (240) may have an upwardly convex shape, but may be reversed when an external force pressing down from above is applied, and when the external force is removed, it is be reversed again and its shape may be restored. The number of the leaf spring (240) may be plural.

The leaf spring (240) may be positioned in mounting groove (212) of the lower housing (210).

The pressing button (230) may be positioned on the lower housing (210), however, each of the lower protrusion (234) may be positioned on each of the leaf spring (240). The numbers of the button protrusion, the lower protrusion, the mounting groove, the exposure hole, and the leaf spring may be the same and plural. Each of the pressing button may be exposed through each of the exposure hole, each of the leaf spring may be disposed in each of the mounting groove, and each of the lower protrusion may be disposed on each of the leaf spring.

Next, when the upper housing (220) is coupled to the lower housing (210), the button protrusion (232) of the pressing button (230) is exposed outside through the exposure hole (222) in an upward direction.

The user may operate the pressing button (230) using fingers. Specifically, the user may operate the pressing button (230) by pressing or applying a pressure to the button protrusion (232) exposed through the exposure hole (222).

At this time, when no external force is applied, the lower protrusion (234) maintains contact with the leaf spring (240). When the user presses the pressing button (230) and the pressing button (230) is pressed, the lower spring (234) may descend and the leaf spring (240) may be reversed. Thereafter, when the user removes the external force, the leaf spring (240) may be restored.

As described above, while the user operates the pressing button (230), the leaf spring (240) is repeatedly deformed and restored, allowing the user to feel a sense of operation. With the sense of operation, the user may be prevented from drowsiness, improve concentration, recover from fatigue, and relieve stress. Moreover, sound is generated during the operation of the fidget (200), thereby, stimulating the user's hearing.

Figure 7:
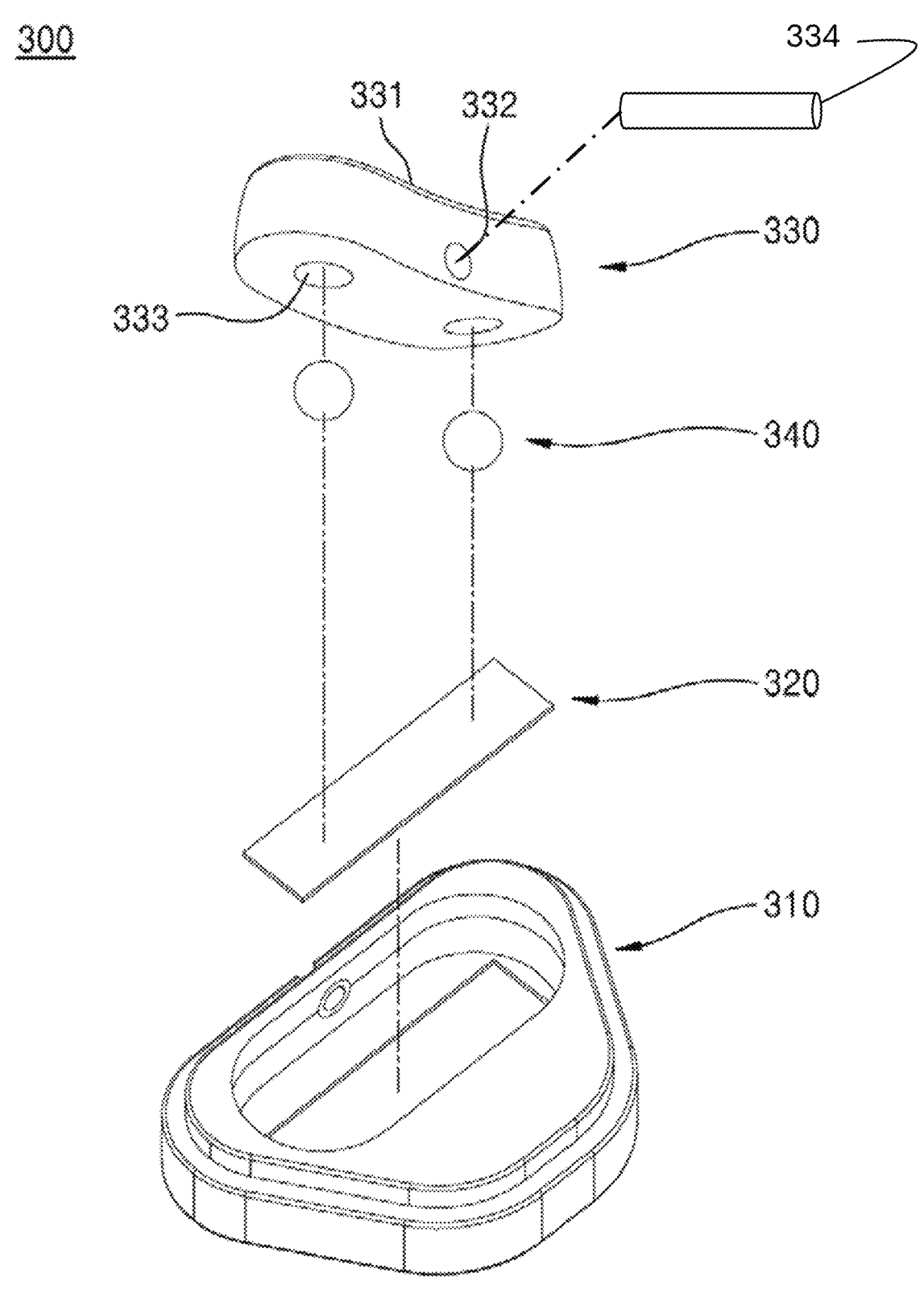
FIG. 7 is an exploded view describing a fidget of the steering wheel grip assembly for automobiles according to another embodiment of this present invention.
Figure 8:
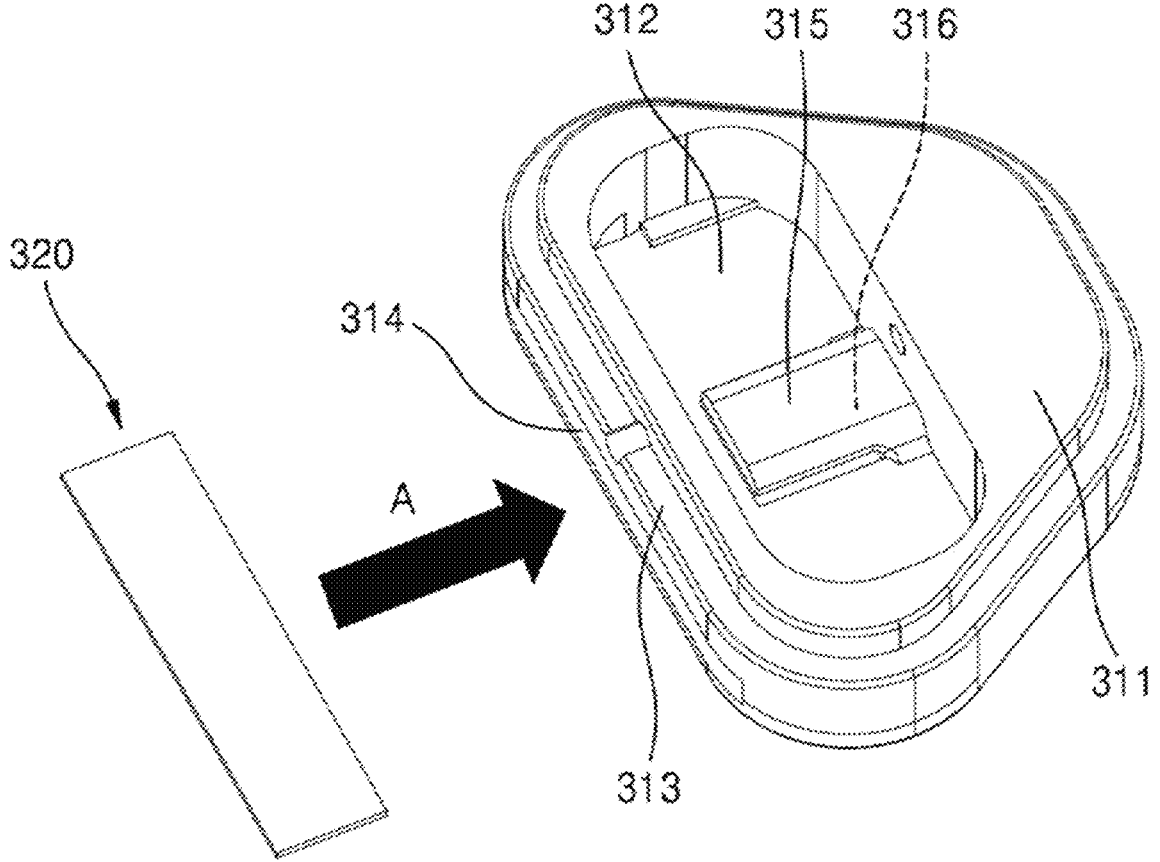
FIGS. 8-9 show coupling relationship between the fidget housing and the panel steel plate in FIG. 7.
Figure 9:
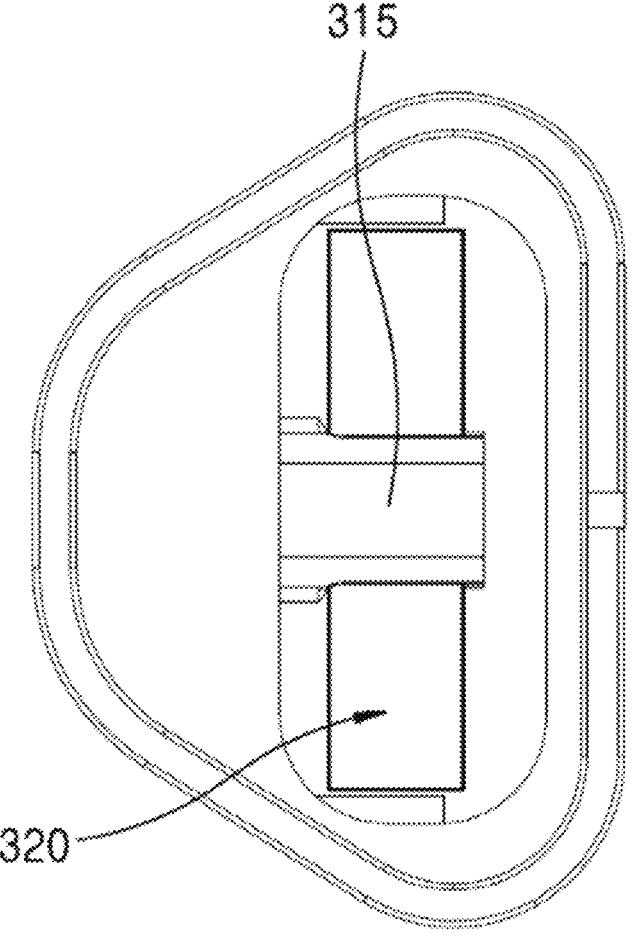

FIG. 7 is an exploded view showing fidget (300) of a steering wheel grip assembly for automobiles according to an embodiment of this present invention, and FIGS. 8-9 show the connection relationship between a fidget housing (310) and the panel steel plate (320) in FIG. 7.

According to one embodiment of this present invention, the fidget (300) may include a fidget housing (310) comprising a mounting groove (312) and a shaft hole (332) extending in a direction intersecting the mounting groove (312), a panel steel plate (320) disposed on a lower portion of the mounting groove (312), a seesaw button (330) disposed in the mounting groove (312) and on the panel steel plate (320), and a magnet (340) disposed on a lower portion of the seesaw button (330).

The fidget housing (310) may include a housing body (311) and the mounting groove (312) disposed on the housing body (311).

According to one embodiment of the present invention, the fidget housing (310) may comprise a circumference of the fidget housing (310) and include a side wall part (313) comprising an outer periphery of the fidget housing and surrounding the mounting groove (312). An open slot (314) may be formed at at least a part of the side wall part (313). The open slot (314) is a slot penetrating the side wall part (313), and the mounting groove (312) may be open toward a side direction through the open slot (314).

A fixing pin (315) may be provided in the mounting groove (312). The fixing pin (315) is a pin extending inside the mounting groove (312), and a lower portion of the fixing pin (315) is spaced apart from the lower portion of the mounting groove (312) at a predetermined distance. Accordingly, a fixing space (316) is formed between the fixing pin (315) and the lower portion of the mounting groove (312). The fixing space (316) is open toward a direction where the open slot (314) is located.

The panel steel plate (320) may have a board-shape with a predetermined length and a predetermined width. The panel steel plate (320) may be a member whose shape is deformed by an external force and whose shape is restored when the external force is removed.

The panel steel plate (320) may be located in the mounting groove (312). Specifically, as shown by an arrow A in FIG. 8, the panel steel plate (320) may be inserted into the mounting groove (312). Additionally, as shown in FIG. 9, at least a part of the panel steel plate (320) inserted into the mounting groove (312) may be fixed between the fixing pin (315) and the lower portion of the mounting groove (312). That is, the panel steel plate (320) may be fixed after being coupled in the fixing space (316). Accordingly, insertion and fixing of the panel steel plate (320) may be easily achieved.

The panel steel plate (320) may be made of a material having elasticity, and may be made of a material that can be magnetically coupled to the magnet (340) by a magnetic force of the magnet (340).

The seesaw button (330) may have a seesaw button body (331) and a shaft hole (332) penetrating a side of the seesaw button body (331) horizontally.

A fixing groove (333) is disposed at the lower portion of the seesaw button (330) for fixing the magnet (340). The fixing groove (333) may have a size and shape suitable for fixing the magnet (340). The fixing groove (333) may be provided at both ends of the lower portion of the seesaw button (333) with the shaft hole (332) as the center.

The magnet is a member that has a magnetism. The magnet (340) may be fixed to the fixing groove (333) provided at the bottom of the seesaw button (330). Accordingly, the magnet (340) may be provided at both ends of the lower portion of the seesaw button (330) with the shaft hole (332) as the center.

As shown in FIG. 7 of the drawings, the seesaw button (330) is capable of seesaw movement around a seesaw shaft (334) that passes through the shaft hole (332).

The user may operate the seesaw button (330) with fingers. Specifically, when one side of the seesaw button (330) is pressed, the seesaw button (330) may move around the seesaw shaft (334) so that the one end descends. At this time, the magnet (340) may come into the magnetic contact with the panel steel plate (320) by magnet's pressing one end of the panel steel plate (320). In contrast, when the user presses the other end of the seesaw button (330), the other end of the seesaw button (330) may descend and the one end may ascend. Additionally, the magnet (340) and the panel steel plate (320) may come into magnetic contact with or may be separated from each other. During this process, the user can feel a sense of operation. By feeling this sense of operation, the user may prevent drowsiness, improve concentration, recover from fatigue, and relieve stress. In addition, sound is generated during the operation of the fidget (300), and thus, this may stimulate user's hearing.

Figure 10:
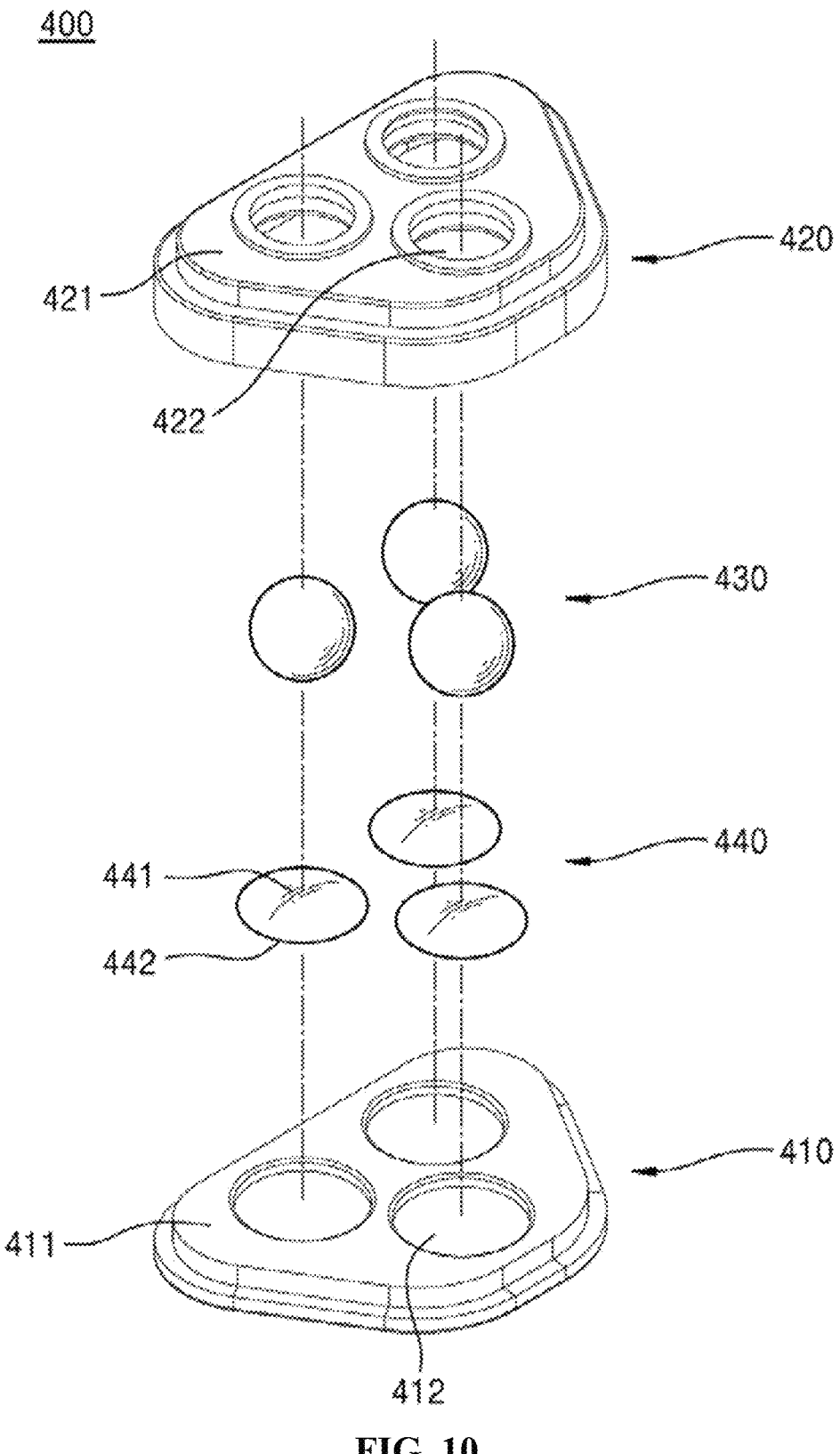
FIG. 10 is an exploded view describing a fidget of the steering wheel grip assembly for automobiles according to another embodiment of this present invention.

FIG. 10 is an exploded view showing a fidget (400) of a steering wheel grip assembly for automobiles according to an embodiment of this present invention.

According to one embodiment of this present invention, the fidget (400) may include a lower housing (410) on which a mounting groove (412) is disposed, an upper housing (420) covering the lower housing (410) and including an exposure hole (422) on the mounting groove (412), a ball button (430) disposed on the lower housing (410), wherein at least a portion of the ball button is exposed outside through the exposure hole (422), and a leaf spring (440) disposed in the mounting groove (412) and below the ball button (430).

The lower housing (410) forms a lower part of a housing. The lower housing (410) may include a lower housing body (411) and a mounting groove (412) disposed on an upper surface of the lower housing body (411). The number of mounting groove (412) may be plural.

The upper housing (420) may include an upper housing body (421) and the exposure hole (422) penetrating the upper housing body (421). The number of the exposure hole (422) may be plural.

The ball button (430) may be a sphere-shaped button with a predetermined diameter. For instance, the ball button (430) may be a steel bead with a predetermined diameter.

The leaf spring (440) may be a shield-type spring. The leaf spring (440) may have an upwardly convex shape, but may be reversed when an external force pressing down from above is applied, and when the external force is removed, it is be reversed again and its shape may be restored. The number of the leaf spring (440) may be plural.

The leaf spring (440) may be positioned in mounting groove (412) of the lower housing (410).

The ball button (430) may be disposed on the lower housing (410), but on each of the leaf spring (440). The numbers of the ball button, the mounting groove, the exposure hole, and the leaf spring may be the same and plural, at least a portion of each of the ball button may be respectively exposed through each of the exposure hole, each of the leaf spring may be disposed in each of the mounting groove, and each of the ball button may be disposed in each of the leaf spring.

Next, when the upper housing (420) is coupled to the lower housing (410), at least the portion of the ball button (430) is exposed outside through the exposure hole (422) in an upward direction.

The user may operate the ball button (430) with fingers. Specifically, the pressing button may be operated by pressing or rolling the ball button (430) exposed outside through the exposure hole (422). In particular, the user may feel various types of operation when there are a multiple number of ball buttons (430).

As described above, operating the ball button (430) by pressing or rolling, the user may feel a sense of operation. With the sense of operation, the user may be prevented from drowsiness, improve concentration, recover from fatigue, and relieve stress. Moreover, sound is generated during the operation of the fidget (400), thereby, stimulating the user's hearing.

FIG. 11 is a diagram showing a steering wheel grip assembly (1) for automobiles being attached to a steering wheel (H) for automobiles and used by a user. When the user grips the automobile steering wheel (H) with the hand (P), the user naturally grips the automobile steering wheel grip assembly (1) according to an embodiment of the present invention, and the user's fingers are located on the fidget (20). Therefore, the user can operate the fidget (20) while driving, and by feeling the feeling of operation, the user can prevent drowsiness, recover from fatigue, and relieve stress.

Although not shown in FIG. 11 of the drawings, a steering wheel grip assembly according to an embodiment of this present invention may further comprise a steering wheel cover which covers a part of the steering wheel except the portion covered by the steering wheel grip assembly. In other words, if a car steering wheel is divided by two portions-a first portion and a second portion, and the grip body is configured to cover the first portion, the cover is configured to cover the second portion of the car steering wheel.

Although preferred embodiments have been shown and described above, the present invention is not limited to the specific embodiments described above. Various modifications can be made by those skilled in the art without departing from the gist of the invention as claimed in the claims. These modifications should not be understood to be individually from the technical idea or perspective of the present invention.

The invention claimed is:

1. A steering wheel grip assembly for automobiles, comprising:
   a grip body attachable to a car steering wheel, configured for covering partially an outer circumference of the car steering wheel, and having a plurality of body protrusions disposed on an outer side surface thereof and an opening disposed at an end of the grip body and partially surrounding the outer circumference; and
   a fidget mounted on the grip body,
   wherein the fidget comprises:
      a housing comprising an exterior of the fidget and mounted on the grip body; and
      an operator mounted on the housing,
      wherein the operator is configured to be operated by a user with fingers while the user grips the grip body,
   wherein the fidget further comprises:
      a lower housing including a mounting groove;
      an upper housing covering the lower housing and including an exposure hole disposed on the mounting groove; and
      an operation gear disposed in the mounting groove and exposed outside through the exposure hole.

2. The steering wheel grip assembly according to claim 1, wherein the grip body includes:
   a grip having a width and an area, along a longitudinal direction and a circumferential direction of the grip body, and including the plurality of body protrusions; and
   a fidget mounting groove in which the fidget is mounted,
   wherein the fidget mounting groove is disposed at a front or a rear of the grip body, and the fidget mounting groove is disposed at one side of the grip body in the longitudinal direction of the grip body, such that, when a palm of the user grips the grip, a thumb or an index finger of the user can be positioned on the fidget.

3. The steering wheel grip assembly according to claim 1, wherein the grip body includes:
   a grip having a width and an area, along a longitudinal and circumferential direction of the grip body, and including the plurality of body protrusions; and
   a mounting groove in which the fidget is mounted,
   wherein the mounting groove is disposed at a rear of the grip body and at one side of the grip body in the longitudinal direction, such that, when a palm of the user grips the grip, an index finger of the user can be positioned on the fidget.

4. The steering wheel grip assembly according to claim 1, wherein the operation gear comprises:
   a gear body including a cog; and
   a gear shaft including a polygonal shaft having at least one edge, and wherein the mounting groove comprises:

a gear groove on which the gear body is disposed; and a shaft groove disposed at both sides of the gear groove, wherein the gear shaft is disposed on the shaft groove.

5. The steering wheel grip assembly according to claim 1, wherein the fidget further comprises:

a ball button disposed on the lower housing, wherein at least a portion of the ball button is exposed outside through the exposure hole; and a leaf spring disposed in the mounting groove and below the ball button.

6. The steering wheel grip assembly according to claim 5, wherein the ball button is a sphere-shaped button having a diameter, wherein the ball button reverses the leaf spring when an external force is applied and the ball button is pressed, and wherein the leaf spring is restored when the external force is removed.

7. A steering wheel grip assembly for automobiles, comprising:

a grip body attachable to a car steering wheel, configured for covering partially an outer circumference of the car steering wheel, and having a plurality of body protrusions disposed on an outer side surface thereof and an opening disposed at an end of the grip body and partially surrounding the outer circumference; and a fidget mounted on the grip body, wherein the fidget comprises:

a housing comprising an exterior of the fidget and mounted on the grip body; and an operator mounted on the housing, wherein the operator is configured to be operated by a user with fingers while the user grips the grip body, wherein the fidget comprises:

a lower housing including a mounting groove;

an upper housing covering the lower housing and including an exposure hole disposed on the mounting groove;

a pressing button disposed on the lower housing, wherein at least a portion of the pressing button is exposed outside through the exposure hole; and a leaf spring disposed in the mounting groove and below the pressing button.

8. The steering wheel grip assembly according to claim 7, wherein the pressing button comprises:

a base board having an area;

a button protrusion having a height and disposed at an upper surface of the base board; and a lower protrusion disposed at a lower surface of the base board and below the pressing button, wherein the lower protrusion is in contact with the leaf spring when an external force is not applied, wherein the lower protrusion descends and reverses the leaf spring when the pressing button is pressed by the external force and the lower protrusion is pressed, and wherein the leaf spring is restored when the external force is removed.

9. A steering wheel grip assembly for automobiles, comprising:

a grip body attachable to a car steering wheel, configured for covering partially an outer circumference of the car steering wheel, and having a plurality of body protrusions disposed on an outer side surface thereof and an opening disposed at an end of the grip body and partially surrounding the outer circumference; and a fidget mounted on the grip body, wherein the fidget comprises:

a housing comprising an exterior of the fidget and mounted on the grip body; and an operator mounted on the housing, wherein the operator is configured to be operated by a user with fingers while the user grips the grip body, wherein the fidget comprises:

a fidget housing including a mounting groove and a shaft hole extending in a direction intersecting the mounting groove;

a panel steel plate disposed on a lower surface of the mounting groove;

a seesaw button disposed in the mounting groove and on the panel steel plate; and a magnet disposed on a lower portion of the seesaw button, wherein the seesaw button is configured for seesaw movement around a seesaw shaft penetrating the shaft hole, wherein the magnet is disposed symmetrically at both ends of the lower portion of the seesaw button with the seesaw shaft as a center, and wherein the magnet is disposed at both ends of the panel steel plate in a longitudinal direction.

10. The steering wheel grip assembly according to claim 9, wherein the fidget housing comprises:

a side wall comprising an outer peripheral portion of the fidget housing and surrounding the mounting groove;

an open slot disposed at the side wall; and a fixing pin disposed in the mounting groove and spaced apart from the lower surface of the mounting groove, wherein the fixing pin is open in a direction toward the open slot, wherein the panel steel plate is inserted into the mounting groove through the open slot, and wherein the panel steel plate is fixed between the fixing pin and the lower surface of the mounting groove.

\* \* \* \* \*